(12) United States Patent
Tanaka

(10) Patent No.: US 7,437,002 B2
(45) Date of Patent: Oct. 14, 2008

(54) IMAGE RECOGNITION SYSTEM UTILIZING AN EDGE IMAGE AND A BINARY IMAGE

(75) Inventor: Tetsuomi Tanaka, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 721 days.

(21) Appl. No.: 10/923,806

(22) Filed: Aug. 24, 2004

(65) Prior Publication Data

US 2005/0047660 A1 Mar. 3, 2005

(30) Foreign Application Priority Data

Aug. 25, 2003 (JP) ............................... 2003-300049

(51) Int. Cl.
*G06K 9/34* (2006.01)

(52) U.S. Cl. ........................ 382/199; 382/266; 382/176; 382/173; 382/192

(58) Field of Classification Search ................. 382/173, 382/176, 192, 199, 266
See application file for complete search history.

(56) References Cited

U.S. PATENT DOCUMENTS

| 5,732,153 A | 3/1998 | Ohsawa |
| 5,956,421 A | 9/1999 | Tanaka et al. ............... 382/172 |
| 2002/0021840 A1 | 2/2002 | Ohara et al. |

(Continued)

FOREIGN PATENT DOCUMENTS

EP 0 505 729 9/1992

JP 62-147584 7/1987

(Continued)

OTHER PUBLICATIONS

S.J. Perantonis, et al., "A novel Web image processing algorithm for text area identification that helps commercial OCR engines to improve their Web image recognition efficiency", Proceedings Of The Second INternation Workshop On Web Document Analysis, Aug. 3, 2003.

(Continued)

*Primary Examiner*—Vikkram Bali
*Assistant Examiner*—Eueng-Nan Yeh
(74) *Attorney, Agent, or Firm*—Fitzpatrick, Cella, Harper & Scinto

(57) ABSTRACT

An image processing apparatus processes an input image, in which an edge image is created by executing an extracting operation on the input image, and a binary image is created by performing a thresholding operation on the input image. A first partial thresholding unit creates an output binary image by extracting a character area from the input image, which corresponds to a character area identified from the created edge image, and performs a thresholding operation on the extracted character area. A second partial thresholding unit creates an output binary image by extracting a character area from the input image, which corresponds to a character area identified from the created binary image, and performs a thresholding operation on the extracted character area. An output unit outputs the output binary image created by said first partial thresholding unit and the output binary image created by said second partial thresholding unit to a memory, wherein the first partial thresholding unit determines whether a character in the extracted character area is a reversed character, and if it is determined that the character is a reversed character, creates an output binary image by reversing and performing the thresholding operation on the character area.

8 Claims, 7 Drawing Sheets

U.S. PATENT DOCUMENTS

2003/0012439 A1 1/2003 Lawton
2003/0039394 A1 2/2003 Yamazaki

FOREIGN PATENT DOCUMENTS

| JP | 7-8007 | 1/1995 |
| JP | 7-160815 | 6/1995 |
| JP | 8-223409 | 8/1996 |
| JP | 9-305754 | 11/1997 |
| JP | 2002-283614 | 10/2002 |

OTHER PUBLICATIONS

H.M. Suen, et al., Text string extraction from images of colour-printed documents, IEE Proceedings: Vision, Image And Signal Processing, Aug. 27, 1996, vol. 143, No. 4, pp. 210-216.

"Connectivity Based Thresholding", IBM Technical Disclosure Bulletin, Jan. 1, 1996, vol. 39, No. 1, pp. 277-279.

Japanese Office Action dated Jun. 9, 2008 issued during prosecution of related Japanese application No. 2003-300049.

FIG. 5

501
IX240 SYSTEM FILE WILL TREASURE MEMORABLE SEASONS.
- CARTRIDGES AND INDEX PRINTS ARE NEATLY ORGANIZED FOR EACH ID NUMBER.

   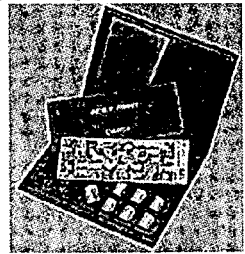

TYPE C (2:3)   TYPE H (9:16)        TYPE P (1:3)

IX240 SYSTEM FILE

MAGNETIC SHIELDING SPECIFICATIONS. 40-FRAME INDEX PRINT COMPATIBLE.

502
IX240 SYSTEM FILE WILL TREASURE MEMORABLE SEASONS.
- CARTRIDGES AND INDEX PRINTS ARE NEATLY ORGANIZED FOR EACH ID NUMBER.

   

TYPE C (2:3)   TYPE H (9:16)        TYPE P (1:3)

IX240 SYSTEM FILE

MAGNETIC SHIELDING SPECIFICATIONS, 40-FRAME INDEX PRINT COMPATIBLE.

503
IX240 SYSTEM FILE WILL TREASURE MEMORABLE SEASONS.
- CARTRIDGES AND INDEX PRINTS ARE NEATLY ORGANIZED FOR EACH ID NUMBER.

   

TYPE C (2:3)   TYPE H (9:16)        TYPE P (1:3)

IX240 SYSTEM FILE

MAGNETIC SHIELDING SPECIFICATIONS. 40-FRAME INDEX PRINT COMPATIBLE.

504
IX240 SYSTEM FILE WILL TREASURE MEMORABLE SEASONS.
- CARTRIDGES AND INDEX PRINTS ARE NEATLY ORGANIZED FOR EACH ID NUMBER.

TYPE C (2:3)                TYPE P (1:3)

IX240 SYSTEM FILE

MAGNETIC SHIELDING SPECIFICATIONS. 40-FRAME INDEX PRINT COMPATIBLE.

FIG. 6
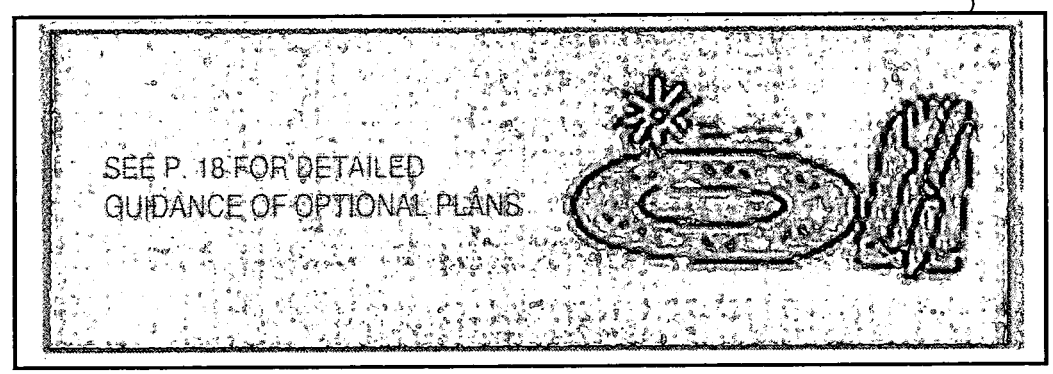
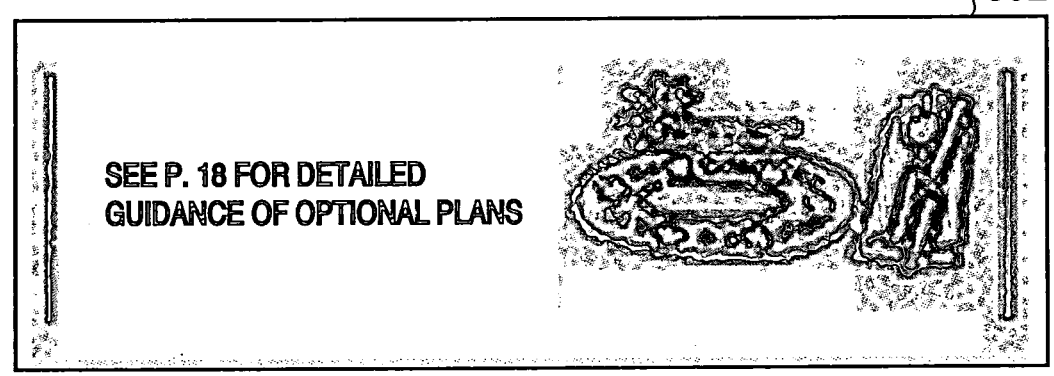
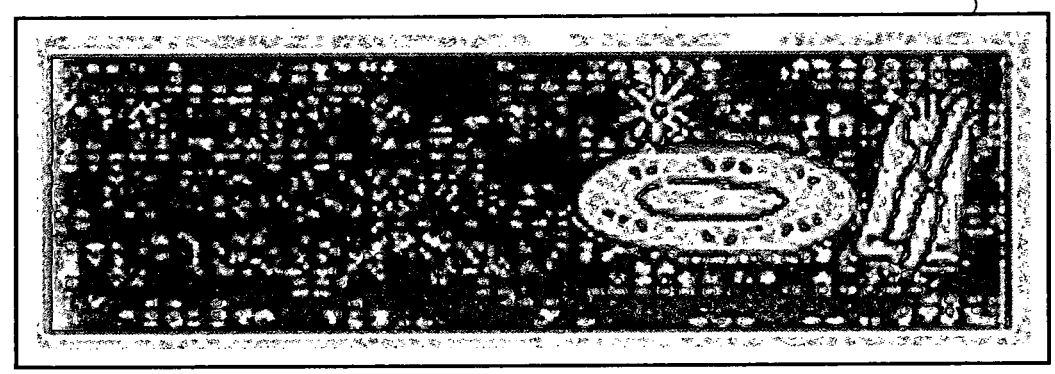
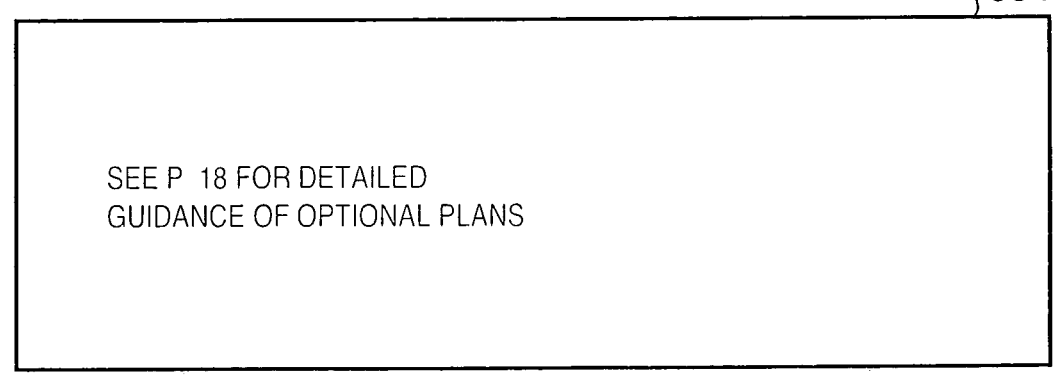

DESIGNATED TIME ZONE

|   | DELIVERY TIME ZONE |
|---|---|
| A | 8 AM TO 2 PM |
| B | 2 PM TO 6 PM |
| C | 6 PM TO 9 PM |

WHEN DESIGNATED DAY FALLS ON SUNDAY OR HOLIDAY.

702

DESIGNATED TIME ZONE

|   | DELIVERY TIME ZONE |
|---|---|
| A | 8 AM TO 2 PM |
| B | 2 PM TO 6 PM |
| C | 6 PM TO 9 PM |

WHEN DESIGNATED DAY FALLS ON SUNDAY OR HOLIDAY.

703

DESIGNATED TIME ZONE

|   | DELIVERY TIME ZONE |
|---|---|
| A | 8 AM TO 2 PM |
| B | 2 PM TO 6 PM |
| C | 6 PM TO 9 PM |

WHEN DESIGNATED DAY FALLS ON SUNDAY OR HOLIDAY.

704

DESIGNATED TIME ZONE

DELIVERY TIME ZONE

A     8 AM TO 2 PM

B     2 PM TO 6 PM

C     6 PM TO 9 PM

WHEN DESIGNATED DAY FALLS ON SUNDAY OR HOLIDAY.

US 7,437,002 B2

IMAGE RECOGNITION SYSTEM UTILIZING AN EDGE IMAGE AND A BINARY IMAGE

FIELD OF THE INVENTION

The present invention relates to an image processing technique for extracting a binary image suitable for a character recognition process from an input image.

BACKGROUND OF THE INVENTION

Conventionally, character recognition techniques of identifying characters contained in input images have been put into practice. For example, a PC can convert an image captured by a scanner into text data by using a character recognition process. When a large number of documents are to be scanned in a copying machine using an ADF, the orientation of each document is determined by using this technique, and a copy can be printed out upon correction of the orientation.

In performing a character recognition process, it is important to convert an input multilevel image into an image suitable for character recognition before the process. In this case, an image suitable for character recognition is a binary image obtained by extracting only characters from the information contained in an input image while maintaining their sizes, layout, thicknesses, fonts, and the like (i.e., information other than character portions is deleted), and expressing a background portion in white and character portions in black. A binarization method of obtaining such a binary image is disclosed in, for example, Japanese Patent Laid-Open Nos. 08-223409 and 09-305754.

According to the conventional binarization method, if a reversed character is contained in an input image, a binary image is output without changing the reversed character. As a consequence, the reversed character image portion may not be recognized as a character and hence not be regarded as a target for character recognition. It is very difficult to determine whether or not an image after binarization is a reversed character. If, therefore, a reversed character is contained in a given image, the character recognition precision deteriorates.

Along with increasing color document images owing to improvements in the throughput of computers, increases in memory capacity, advances in scanners, and the like, there have appeared more images which have low contrast between background colors and character colors and more images which contain both images other than characters, e.g., photos, and characters. As a consequence, in some cases, it is impossible to obtain a binary image suitable for character recognition by only binarization threshold adjustment or block size adjustment. When, for example, a single binarization threshold is set for the entire surface of an image, an image unsusceptible to small image unevenness can be generally obtained. In the case of a color image having a plurality of character colors and character portion background colors, however, a deterioration in image quality occurs. Performing binarization while adaptively determining a threshold for each small block can cope with changes in character portion background color for each processing block. On the other hand, when the same processing block contains both a character area and another kind of area such as a photo area, the resultant image tends to include noise. In addition, as the block size is decreased to prevent each processing block from containing a plurality of areas, the influence of noise in each block increases. This rather increases density unevenness and tends to produce noise.

As described above, no conventional binarization methods could output any binary image which could realize high character recognition precision in the case of an image containing reversed characters, an image having relatively low contrast between a background color and a character color, e.g., a color image, or and an image containing both a character portion and an image portion other than characters, such as a photo portion.

SUMMARY OF THE INVENTION

The present invention has been made in consideration of the above problems, and has as its object to improve character recognition precision by outputting an image suitable for a character recognition process even when an image containing reversed characters or a multilevel image is input.

In order to achieve the above object, an image processing apparatus according to the present invention has the following arrangement. Specifically, an image processing apparatus which processes an input image, comprising:

edge image creating unit configured to creating an edge image by extracting an edge of the input image;

binary image creating unit configured to creating a binary image from the input image;

partial binarization unit configured to creating an output binary image by identifying a character area based on both of the created edge image and the created binary image and binarizing the identified character area of the input image; and output unit configured to outputting an output binary image created by the partial binarization means, wherein the partial binarization means determines whether a character in a character area identified based on the created edge image is a reversed character, and if it is determined that the character is a reversed character, creates an output binary image by reversing and binarizing the character.

According to the present invention, even if an image containing reversed characters or a multilevel image is input, character recognition precision can be improved by outputting an image suitable for a character recognition process.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a view showing a concrete example of a multilevel image;

FIG. 6 is a view showing a concrete example of a multilevel image; and

FIG. 7 is a view showing a concrete example of a multilevel image.

DETAILED DESCRIPTION OF THE PREFERRED EMBODIMENTS

Preferred embodiments of the present invention will now be described in detail in accordance with the accompanying drawings.

Each embodiment of the present invention will be described below with reference to the accompanying drawings.

First Embodiment

<Arrangement of Image Processing Apparatus>

Figure 1:
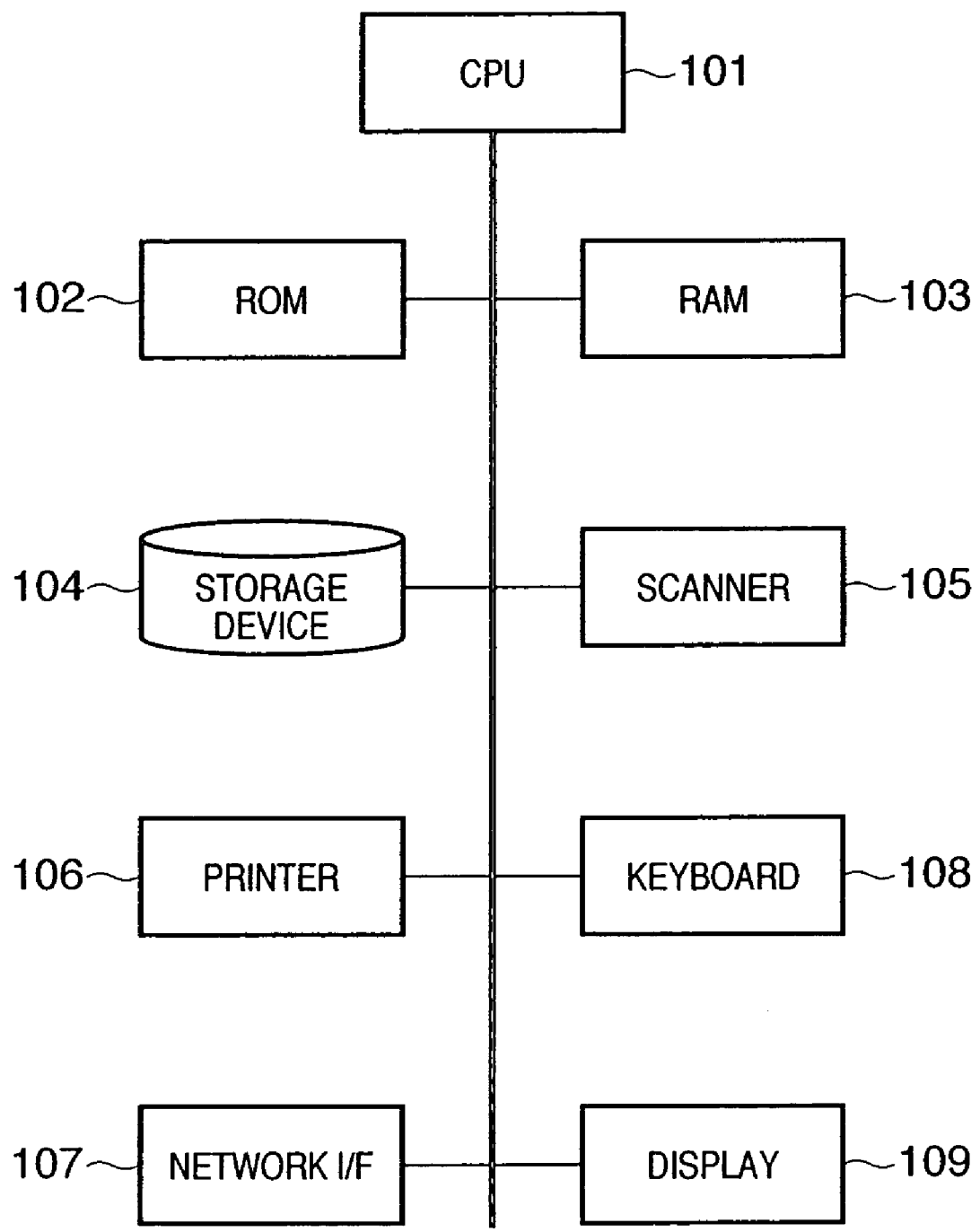
FIG. 1 is a block diagram showing the arrangement of an image processing apparatus according to the first embodiment of the present invention.

FIG. 1 is a view showing the arrangement of an image processing apparatus according to this embodiment. Reference numeral 101 denotes a CPU; 102, a ROM which stores programs and data for the CPU 101; 103, a RAM functioning as a work area for the CPU 101, which, for example, temporarily stores a document image to be processed; 104, a storage device which stores document images, files, and the like; 105, a scanner which scans a target document image; 106, a printer which prints out a document image; 107, a network I/F which delivers a created compressed image; and 108 and 109, a keyboard and display, respectively, which serve as user I/Fs for operation and display.

<Flow of Processing in Image Processing Apparatus>

Figure 2:
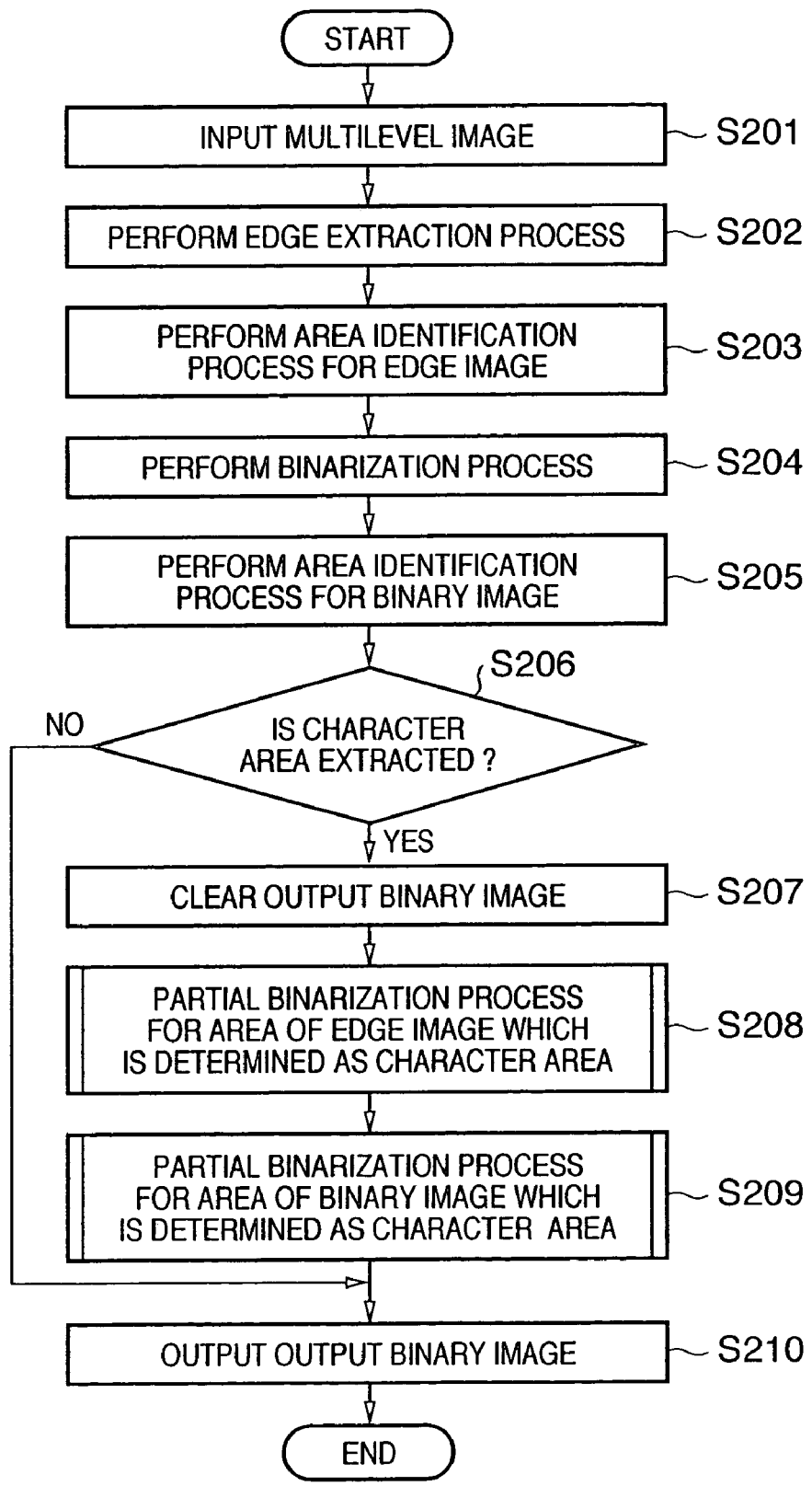
FIG. 2 is a flowchart showing the flow of processing in the image processing apparatus according to the first embodiment of the present invention.
Figure 4:
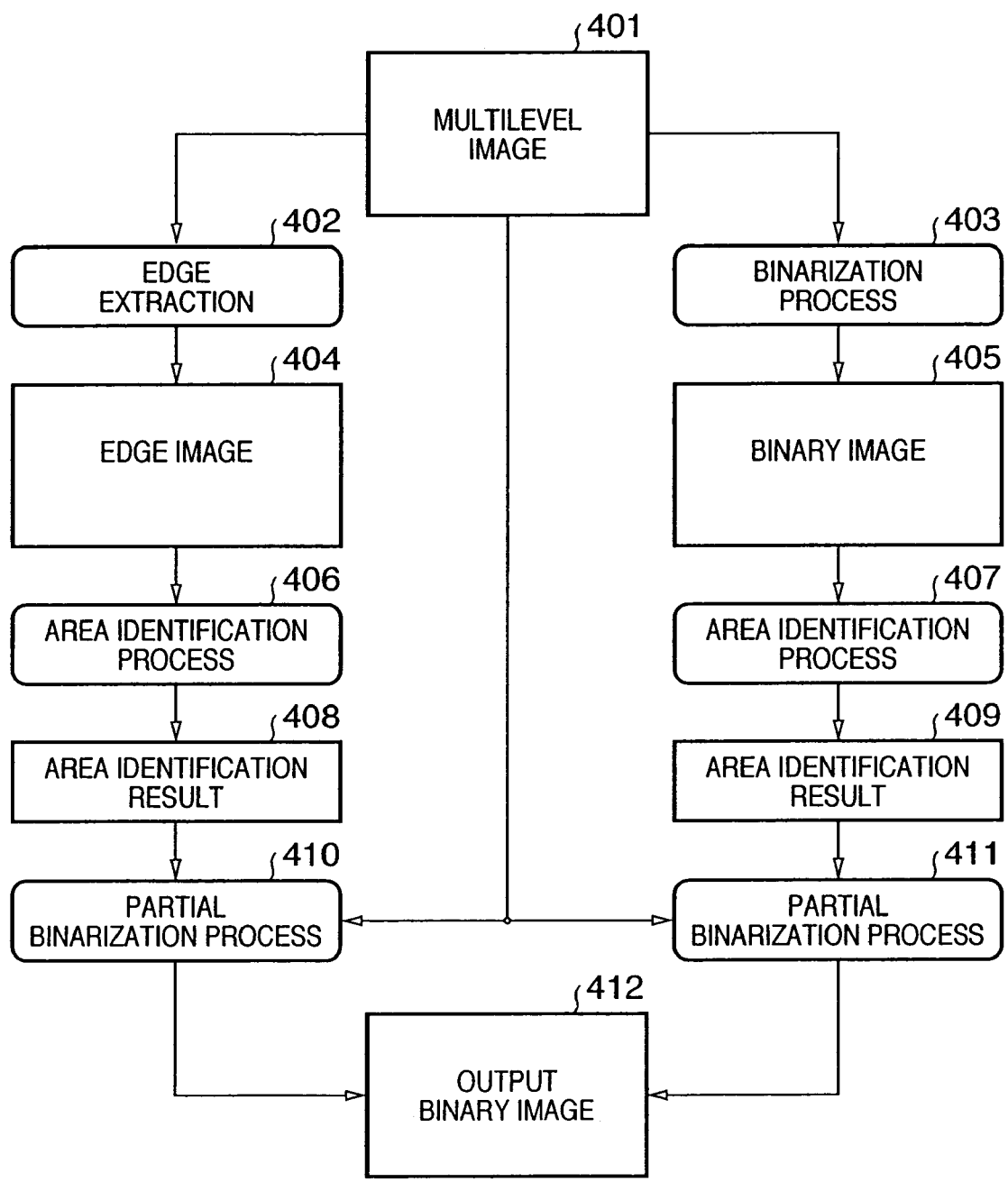
FIG. 4 is a data flow diagram showing the flow of data processed in the image processing apparatus according to the first embodiment of the present invention.

FIG. 2 is a flowchart showing the flow of processing in the image processing apparatus according to this embodiment. FIG. 4 is a data flow diagram showing the flow of data processed in accordance with this flowchart.

In step S201, the storage device 104 or scanner 105 loads a multilevel document image as a multilevel image 401 into the RAM 103. Reference numeral 501 in FIG. 5 denotes a concrete example of the multilevel image 401.

In step S202, an edge image 404 is created by extracting image edges from the multilevel image 401 input in step S201 by an edge extraction process (402). Reference numeral 502 in FIG. 5 denotes a concrete example of the edge image 404.

In step S203, a character area 408 is extracted by performing an area identification process (406) for the edge image 404.

In step S204, a binary image 405 is created from the multilevel image 401 by a binarization process (403). Although an arbitrary binarization technique can be used, a binarization technique which provides high image quality for character portions as disclosed in Japanese Patent Laid-Open Nos. 08-223409 and 09-305754 is preferably used. Reference numeral 503 in FIG. 5 denotes a concrete example of the binary image 405.

In step S205, a character area 409 is extracted from the binary image 405 by an area identification process (407).

Although the area identification processes (406 and 407) are expressed as different processes in the data flow, the same process can be used. The relatively small characters contained in the edge image 404 are almost identical to boldface characters as known from the edge image 502, and relatively large characters are identical in shape to outlined characters. A character area can therefore be extracted by the same area identification method.

In step S206, it is checked whether or not a character area can be extracted. If no character area can be extracted in both steps S203 and 205, a binary image 407 created in step S204 is output as an output result (step S210).

In step S207, an output binary image 412 in the memory is initialized. Although edge extraction and binarization processes are performed for the entire area of the multilevel image 401 in steps S202 and S204, since only character area portions are output in the processes in steps S208 and S209, it is necessary to initialize the entire surface with white pixels.

In step S208, a partial binarization process is performed for the multilevel image 401 with respect to the character area obtained on the basis of an area identification result 408 in step S203, and the resultant binary image is output to a storage memory. In step S209, a partial binarization process is performed for the multilevel image 401 with respect to the character area obtained on the basis of an area identification result 409 in step S205, and the resultant binary image is output to the storage memory.

In step S210, the processing results in steps S208 and S209 are output to a memory for the output binary image 412. Reference numeral 504 in FIG. 5 denotes a concrete example of the output binary image 412, which is the result obtained by processing the concrete example 501 of the multilevel image using this method. Since only a character portion is binarized and output as the output binary image 412, the image can be output in a natural form without any conspicuous boundary portion between a reversed character portion and a non-reversed character portion (If a binary image of the entire area of an image is output as in the prior art, this boundary portion is output in an unnatural form, resulting in adverse effects on a process using the output binary image 412).

Figure 3:
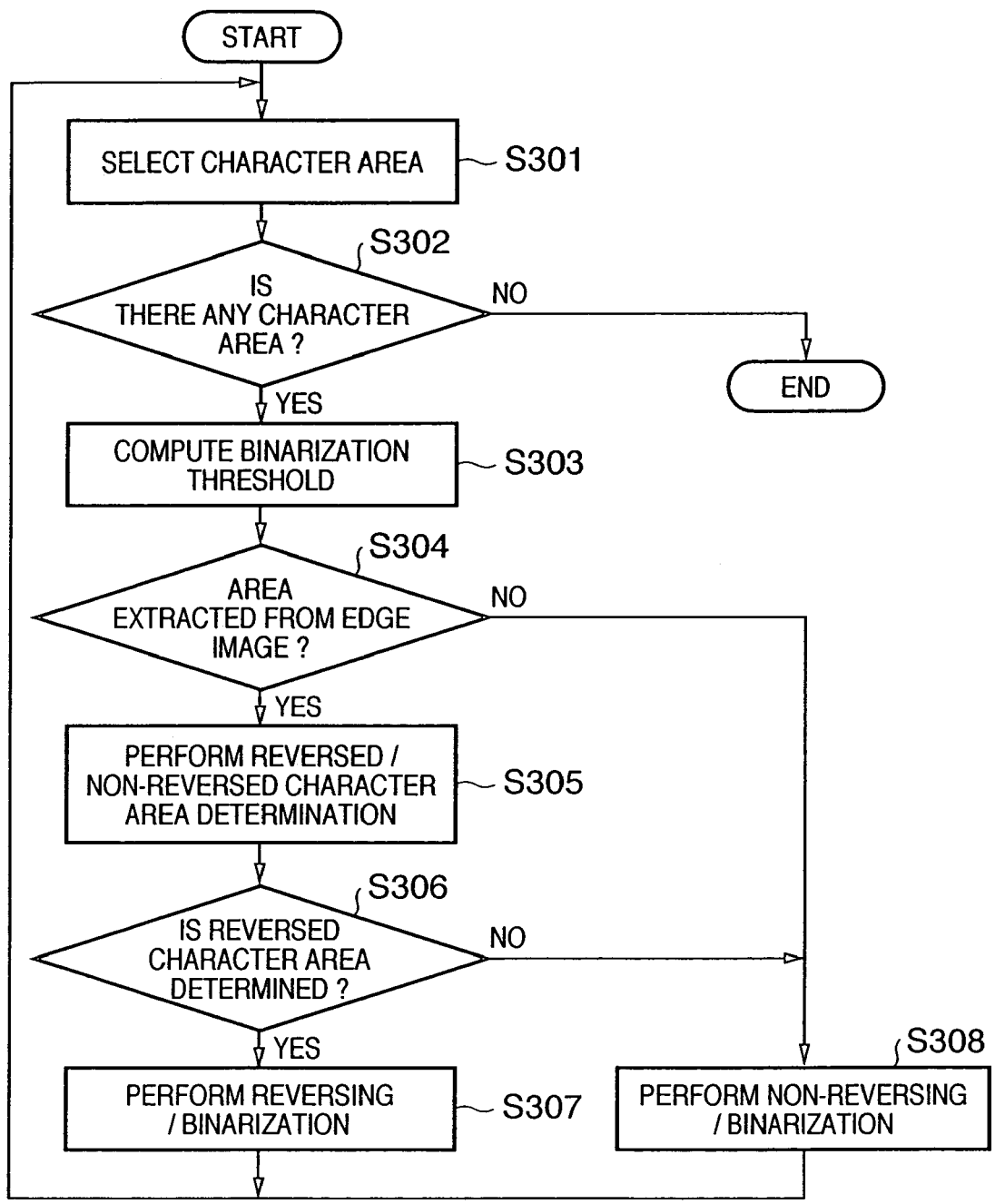
FIG. 3 is a flowchart showing the flow of processing in a partial binarization process in the image processing apparatus according to the first embodiment of the present invention.

FIG. 3 is a flowchart showing the flow of processing in the partial binarization processes in steps S208 and S209.

In step S301, an extracted character area is selected. If it is determined in step S302 that there is a selected character area, the flow advances to step S303. Otherwise, the processing is terminated.

In step S303, a binarization threshold computation process is performed to determine a binarization threshold for the selected character area. Although an arbitrary threshold computation method can be used, a computation method which provides high character image quality is preferably used.

The flow then advances to step S304 to check whether the currently processed area is the data of the area identification result 408 or the data of the area identification result 409. If it is determined that this area is a character area extracted from the data of the area identification result 408, i.e., the edge image, the flow advances to step S305. Otherwise, the flow advances to step S308. Step S305 is a reversed/non-reversed character area determination process, in which it is checked whether the target character area is a non-reversed character area with dark characters against a bright background or a reversed character area with bright characters against a dark background.

If it is determined in step S306, on the basis of the determination result in step S305, that the currently processed area is a reversed character area, a reversing binarization process is performed in step S307 with the threshold determined in step S303, and only the character area portion is output to the memory for the output binary image 412. In contrast, if it is determined in step S306 that the currently processed area is a non-reversed character area, a general binarization process is performed in step S308 with the threshold determined in step S303, and only the character area portion is output to the memory for the output binary image 412.

When the processes in steps S307 and S308 are complete, the flow returns to step S301 to shift to the processing for the next character area.

<Reverse/Non-reverse Determination Method>

The reversed/non-reversed character area determination method used in step S305 will be described below by giving a concrete example. Note that as a reversed/non-reversed character area determination method, any one of the following methods may be used, or a different method may be used.

(First Reversed/Non-reversed Character Area Determination Method)

According to a reverse/non-reverse determination method for character areas, the white portion/black portion ratio of an image obtained by binarizing the selected area with the threshold computed in step S303 is calculated. If the proportion of the white portion is larger, this area is determined as a non-reversed character area. If the portion of the black portion is larger, it is determined that the area is a reversed character area.

(Second Reversed/Non-reversed Character Area Determination Method)

The white portion/black portion ratio of an image obtained by binarizing the boundary portion of a target character area with the threshold computed in step S303 is calculated. If the proportion of the white portion is larger, this area is determined as a non-reversed character area. If the portion of the black portion is larger, it is determined that the area is a reversed character area.

(Third Reversed/Non-reversed Character Area Determination Method)

In the binarization threshold computation process in step S303, reverse/non-reverse determination is performed depending on the sign of the skew of a histogram by using the method disclosed in Japanese Patent Laid-Open No. 08-223409 or 09-305754. If the sign of the skew value is negative, a non-reversed area is determined. If the sign of the skew value is positive, a reversed area is determined. Using a skew value can increase the processing speed because computation for this value is finished when a binarization threshold is determined.

(Fourth Reversed/Non-reversed Character Area Determination Method)

If the difference between the proportions of white and black portions is smaller than a predetermined value in the reverse/non-reverse determination method (first method) and the absolute value of a skew value is smaller than a predetermined value in the reverse/non-reverse determination method (third method), determination is performed by the reverse/non-reverse determination method (second method).

(Fifth Reversed/Non-reversed Character Area Determination Method)

Since non-reversed characters exist in general documents at a high probability, determination criteria in the first to fourth determination methods are so set as to give priority to "non-reverse".

<Order of Partial Binarization Processing>

In a partial binarization process for a character area, after a character area extracted from an edge image is processed, a character area extracted from the binary image is processed. The processing result obtained afterward remains in an overlapping area. If, however, a character area from an edge image is processed first, an overlapping portion is overwritten by a process for a character area of a subsequent binary image. This makes it possible to prevent a reverse/non-reverse determination error.

<Features of Processes in Image Processing Apparatus>

The features of the respective processes in the flowchart shown in FIG. 4 will be described next.

A. Advantage of Edge Image 404

A feature of the image processing apparatus according to this embodiment is that an area identification process is also performed with respect to the edge image 404. The edge image 404 obtained by the edge extraction process 402 is output without any discrimination between non-reversed characters and reversed characters. This makes it possible to perform an area identification process without any discrimination.

Reference numeral 601 in FIG. 6 denotes a portion of an input image; 602, an edge image of the portion; and 603, a binary image. Assume that a portion of an input image has a dark background like the portion 601. In this case, if a binarization process is performed only uniformly for the entire input image, an area like the one denoted by reference numeral 603 may be obtained. As a consequence, this area is determined as an image area in the area identification processing 407, and hence cannot be extracted as a character area. In contrast to this, since the edge image 404 is obtained based on the relative luminance difference (brightness difference) between adjacent pixels in the edge extraction process 402, even if an image like the image 601 is input, the edge image 602 can be obtained. As a consequence, a character area can be extracted without being influenced by a background. Therefore, the binary image 412 to be output becomes like an image 604.

B. Advantage of Binary Image 405

Another feature of the image processing apparatus according to this embodiment is that the edge extraction 402 and binarization process 403 are used together to complement each other.

Edge extraction (402) is only slightly influenced by the density of a background. When, however, the extraction result is viewed as an image, since edges exist on the peripheral portions of characters, the characters increase in size. For this reason, when, for example, edge extraction is performed for the characters in a table shown as an image 701 in FIG. 7, since the ruled lines increase in thickness, the characters tend to come into contact with the ruled lines (see "702"). As a result, it is very difficult to separate characters in contact with other portions, character areas cannot be stably extracted in performing an area identification process. In addition, edge extraction is executed by using a filter (e.g. laplacian filter), and hence may react to a local luminance difference to produce noise, thus causing a problem in character extraction. In contrast to this, in the case shown in FIG. 7, the character size in the binary image 405 obtained by the binarization process 403 is maintained, and hence characters and ruled lines do not come into contact with each other as indicated by an image 703. This makes it possible to easily separate characters (see "704").

C. Binarization on Character Area Basis (410, 411)

Still another feature of the image processing apparatus according to this embodiment is that a binarization process (partial binarization process) is performed for the character area 409 extracted from the binary image 403 by calculating a binarization threshold for the multilevel image 401.

This feature is provided because the following problem arises when the binarization technique in step S204 is used alone as described above as a problem in the prior art. When a single threshold is used for an entire surface, binarization can be done without any small noise. On the other hand, when a plurality of character colors and character portion background colors exist in an image, a character portion with poor image quality is generated. In addition, when an input image is divided into blocks (processing blocks), each having a predetermined size, in the form of a lattice, and binarization is performed while a threshold is adaptively determined for each processing block, a change in character portion background color can be coped with for each processing block. On the other hand, density unevenness occurs for each processing block, and when a processing block contains both a character area and another kind of area such as a photo area, noise tends to be generated. If the block size is decreased to prevent each processing block from containing a plurality of areas, the influence of noise or the like increases in each block. As a result, density unevenness increases and noise further tends to be generated.

In contrast to this, partial binarization processes are performed for character areas in steps S208 and S209 to determine a threshold for each character area, thereby coping with a change in character background color for each area and stably computing a threshold from a relatively wide area limited to a character area. That is, since this operation is equivalent to adaptively determining an optimal processing block size, an image having high character image quality with less density unevenness and noise can be obtained.

As is obvious from the above description, according to this embodiment, an image suitable for character recognition can be obtained by performing edge extraction for an input image even if it contains reversed characters. In addition, performing edge extraction together with a binarization process, the drawback caused when an image is processed by edge extraction can be compensated for. Furthermore, performing a binarization process for a character area obtained as a result of edge extraction or a binarization process can obtain a binary image with an optical block size. This makes it possible to output an image suitable for a character recognition process, thus improving the character recognition precision as compared with the prior art.

Second Embodiment

The above edge image 404 is not required if the area identification result 408 can be obtained. The binary image 405 becomes unnecessary when the area identification result 409 is obtained. Therefore, a memory is shared among the edge image 404, binary image 405, and output binary image 412, memory saving can be realized.

Since the processes 402, 404, 406, and 408 are independent of the processes 403, 405, 407, and 409 in the data flow in FIG. 4, the processing speed can be increased by assigning independent resources (memories) to the processes and concurrently performing them.

A character extraction process dedicated to reversed characters may be performed by creating a reversed image by reversing the binary image 405 of the entire input image and performing an area identification process for the reversed image in addition to the processes in steps S208 and S209. In this case, however, the flow branches from step S304 to step S307 in FIG. 3.

Third Embodiment

If the difference between the binarization threshold obtained in step S303 and the binarization threshold in the binarization process 405 falls within a predetermined range, the time for a binarization process can be shortened by copying the corresponding portion of the held binary image 405 to the output binary image 412.

Other Embodiment

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium storing software program codes for realizing the functions of the above-described embodiments to a system or apparatus, and causing the computer (or a CPU or an MPU) of the system or apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

The present invention is not limited to the above embodiments and various changes and modifications can be made within the spirit and scope of the present invention. Therefore, to apprise the public of the scope of the present invention, the following claims are made.

CLAIM OF PRIORITY

This application claims priority from Japanese Patent Application No. 2003-300049 filed on Aug. 25, 2003, which is hereby incorporated by reference herein.

What is claimed is:

1. An image processing apparatus which processes an input image, comprising:
   an edge image creating unit configured to create an edge image by executing an extracting operation on the input image;
   a thresholding unit configured to create a binary image by performing a thresholding operation on the input image;
   an extracting unit configured to extract a first character area from the input image by using the edge image and to extract a second character area from the input image by using the binary image;
   a determination unit configured to determine whether the first character area extracted from the input image by using the edge image is a reversed character area;

a first binarization unit configured to binarize the first character area by reversing and performing a thresholding operation on the first character area if it is determined by said determination unit that the first character area is a reversed character area, and to binarize the first character area by performing a theresholding operation on the first character area if it is determined by said determination unit that the first character area is a non-reversed character area;

a second binarization unit configured to binarize the second character area by performing a thresholding operation on the second character area; and an overwriting unit configured to overwrite the first character area binarized by said first binarization unit by using the second character area binarized by said second binarization unit if the first character area and the second character area overlap.

2. The apparatus according to claim 1, wherein said determination unit calculates a white portion/black portion ratio of the first character area obtained by binarizing the first character area by performing a thresholding operation on the first character area, and determines that the first character area is a non-reversed character area if a proportion of the white portion is larger, and determines that the first character area is a reversed character area if a proportion of the black portion is larger.

3. The apparatus according to claim 1, wherein said determination unit calculates a white portion/black portion ratio of a boundary portion of the first character area obtained by binarizing the first character area by performing a thresholding operation on the first character area, and determines that the first character area is a non-reversed character area if a proportion of the white portion is larger, and determines that the first character area is a reversed character area if a proportion of the black portion is larger.

4. The apparatus according to claim 3, wherein said determination unit calculates a white portion/black portion ratio of the first character area obtained by binarizing the first character area by performing a thresholding operation on the first character area, calculates a skew value of a histogram of the first character area, and performs the determination if the proportion of white to black portions is smaller than a predetermined value and the absolute value of the skew value is smaller than a predetermined value.

5. The apparatus according to claim 1, wherein said determination unit calculates a skew value of a histogram of the first character area and determines that the first character area is a non-reversed character area if a sign of the skew value is negative, and determines that the first character area is a reversed character area if the sign of the skew value is positive.

6. The apparatus according to claim 1, further comprising a setting unit configured to set determination criteria for the determination unit.

7. An image processing method which processes an input image, comprising:

an edge image creating step of creating an edge image by performing an extracting operation on the input image;

a thresholding step of creating a binary image by performing a thresholding operation on the input image;

an extracting step of extracting a first character area from the input image by using the edge image and extracting a second character area from the input image by using the binary image;

a determination step of determining whether the first character area extracted from the input image by using the edge image is a reversed character area;

a first binarization step of binarizing the first character area by reversing and performing a thresholding operation on the first character area if it is determined in the determination step that the first character area is a reversed character area, and binarizing the first character area by performing a theresholding operation on the first character area if it is determined in the determination step that the first character area is a non-reversed character area;

a second binarization step of binarizing the second character area by performing a thresholding operation on the second character area; and an overwriting step of overwriting the first character area binarized in said first binarization step by using the second character area binarized in said second binarization step if the first character area and the second character area overlap.

8. A computer-readable storage medium on which is stored a control program for causing a computer to implement an image processing method which processes an input image, comprising:

an edge image creating step of creating an edge image by performing an extracting operation on the input image;

a thresholding step of creating a binary image by performing a thresholding operation on the input image;

an extracting step of extracting a first character area from the input image by using the edge image and extracting a second character area from the input image by using the binary image;

a determination step of determining whether the first character area extracted from the input image by using the edge image is a reversed character area;

a first binarization step of binarizing the first character area by reversing and performing a thresholding operation on the first character area if it is determined in the determination step that the first character area is a reversed character area, and binarizing the first character area by performing a theresholding operation on the first character area if it is determined in the determination step that the first character area is not a reversed character area;

a second binarization step of binarizing the second character area by performing a thresholding operation on the second character area; and an overwriting step of overwriting the first character area binarized in said first binarization step by using the second character area binarized in said second binarization step if the first character area and the second character area overlap.

* * * * *